United States Patent [19]

Kosch

[11] 4,456,198
[45] Jun. 26, 1984

[54] WELDING WIRE DISPENSER

[76] Inventor: Delmar D. Kosch, 1730 Woodland Dr., Columbus, Nebr. 68601

[21] Appl. No.: 533,217

[22] Filed: Sep. 19, 1983

[51] Int. Cl.³ ............................................. B65H 59/04
[52] U.S. Cl. .............................. 242/156.2; 242/54 R; 242/99; 242/129.8
[58] Field of Search .................. 242/156.2, 156, 129.8, 242/75.4, 75.43, 99, 54 R

[56] References Cited

U.S. PATENT DOCUMENTS

| | | | |
|---|---|---|---|
| 438,782 | 10/1890 | Strowbridge | 242/156.2 X |
| 653,717 | 7/1900 | Wardwell, Jr. | 242/156.2 |
| 1,418,706 | 6/1922 | Hampton | 242/156.2 |
| 2,127,936 | 8/1938 | Pierce | 242/156.2 X |
| 2,528,410 | 10/1950 | Banaszak | 242/156.2 |
| 3,004,732 | 10/1961 | Fischer | 242/129.8 |
| 3,101,912 | 8/1963 | Bartlett | 242/156.2 |
| 3,323,752 | 6/1967 | Kurtz | 242/129.8 |
| 3,436,031 | 4/1969 | Winders | 242/156.2 |
| 4,003,290 | 1/1977 | Haehnel et al. | 87/57 |
| 4,241,884 | 12/1980 | Lynch | 242/54 R |

Primary Examiner—Stanley N. Gilreath
Attorney, Agent, or Firm—Zarley, McKee, Thomte, Voorhees & Sease

[57] ABSTRACT

A welding wire dispenser for dispensing wire to a wire feeder comprising a support having a hub mounted thereon and extending upwardly therefrom. The hub has a horizontally disposed annular brake pad at its upper end. A vertically disposed and vertically movable shaft is rotatably mounted in the support and extends upwardly through the hub. A coil support is rotatably mounted on the upper end of the shaft and is vertically movable therewith. The coil support has a horizontally disposed annular portion at its lower end which is adapted to frictionally engage the annular brake pad to limit the rotation of the coil support at times. An arm is secured to the lower end of the shaft and extends upwardly and outwardly therefrom. A pulley is supported on the upper end of the arm and has the wire extending from the wire coil received thereon. A cam follower is mounted on the shaft within the hub and rolls upon a helical cam surface. As the wire feeder pulls wire from the coil, the arm pivots toward the wire feeder which causes the shaft to rotate and to raise the coil support upwardly so that the coil support will freely rotate.

1 Claim, 5 Drawing Figures

WELDING WIRE DISPENSER

BACKGROUND OF THE INVENTION

In many types of welding operations, a wire feeder feeds wire to a welder. The welding wire is normally wound upon coils or reels and is unwound therefrom as wire is being consumed. Some types of wire dispensers have been provided which can dispense wire from wooden reels while other types of wire dispensers have been provided which can dispense wire from paper reels. However, to best of applicant's knowledge, a wire dispenser has not been provided which can accomodate both paper and wooden spools.

One type of wire dispenser is disclosed in U.S. Pat. No. 4,235,624 wherein wire is pulled from a stationary coil. However, a twist or torque is created in the wire and such a twist or torque frequently interferes with the welding operation. Many other types of wire dispensers have also been provided but they are either extremely cumbersome, expensive or difficult to use.

SUMMARY OF THE INVENTION

A welding wire dispenser is disclosed which dispenses wire to a wire feeder. A floor-engaging support means is provided and has a hollow vertically disposed hub extending upwardly therefrom. A annular brake pad is secured to the upper end of the hub. A vertically disposed shaft rotatably extends upwardly through the hub and is vertically movable by means of a cam follower mounted on the shaft which is in engagement with a helical cam positioned within the hub. A coil support is rotatably mounted on the upper end of the shaft and is vertically movable therewith. The coil support is adapted to support a coil or reel of welding wire thereon. An arm is secured to the lower end of the shaft and extends upwardly and outwardly therefrom so that the pulley at the upper end thereof is disposed laterally of the wire coil. The wire from the coil extends around a pulley and the movement of the wire towards the wire feeder causes the arm to move towards the wire feeder which causes the shaft to rotate and to vertically move so that the coil support may freely rotate with respect to the brake pad.

A principal object of the invention is to provide an extremely simple but yet efficient welding wire dispenser.

A further object of the invention is to provide a welding wire dispenser which relies upon the weight of the wire to aid in halting the rotation of the coil.

A further object of the invention is to provide a welding wire dispenser which can accomodate various types of reels or coils.

Still another object of the invention is to provide a welding wire dispenser which prevents any twisting of the welding wire.

Still another object of the invention is to provide a welding wire dispenser which dispenses welding wire in a smooth manner so as not to interfere with the welding operation.

Yet another object of the invention is to provide a welding wire dispenser which is economical of manufacture and durable in use.

These and other objects will be apparent to those skilled in the art.

DESCRIPTION OF THE PREFERRED EMBODIMENT

Figure 1:
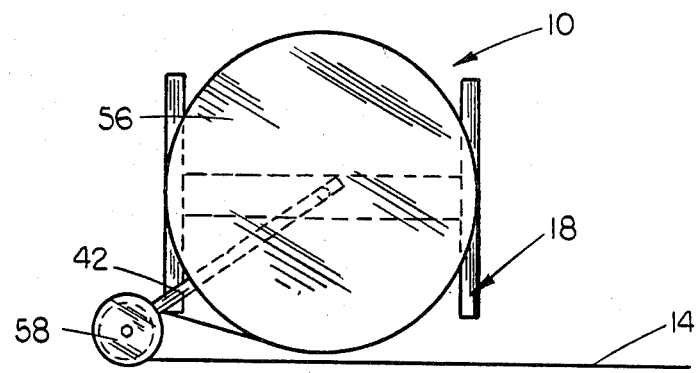
FIG. 1 is a top elevational view of the wire dispenser of this invention.

The wire dispenser of this invention is referred to generally by the reference numeral 10 while the reference numeral 12 refers to a conventional wire feeder adapted to supply welding wire 14 to welder 16.

Figure 4:
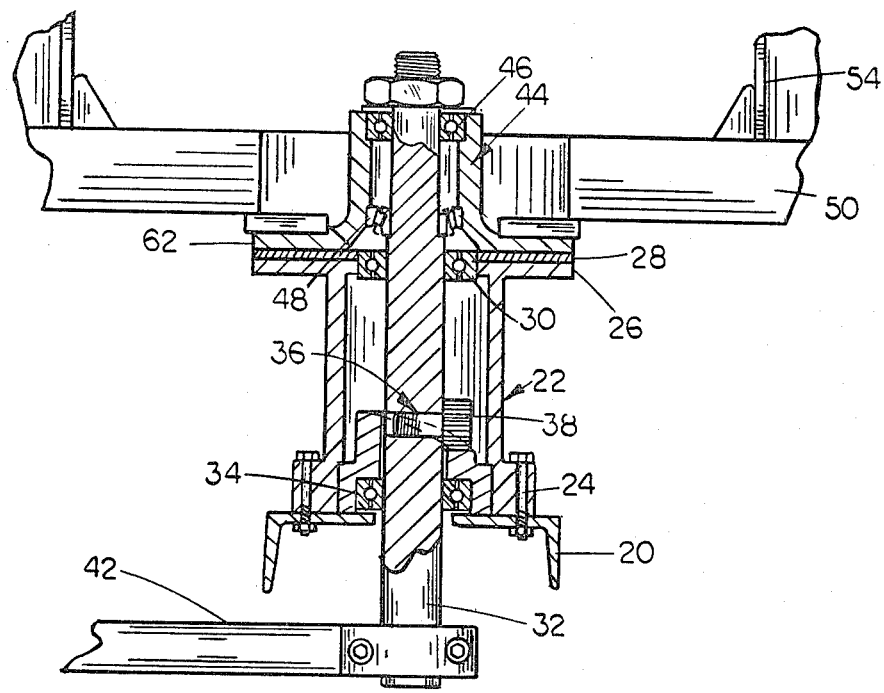
FIG. 4 is an enlarged sectional view seen on lines 4—4 of FIG. 2.
Figure 5:
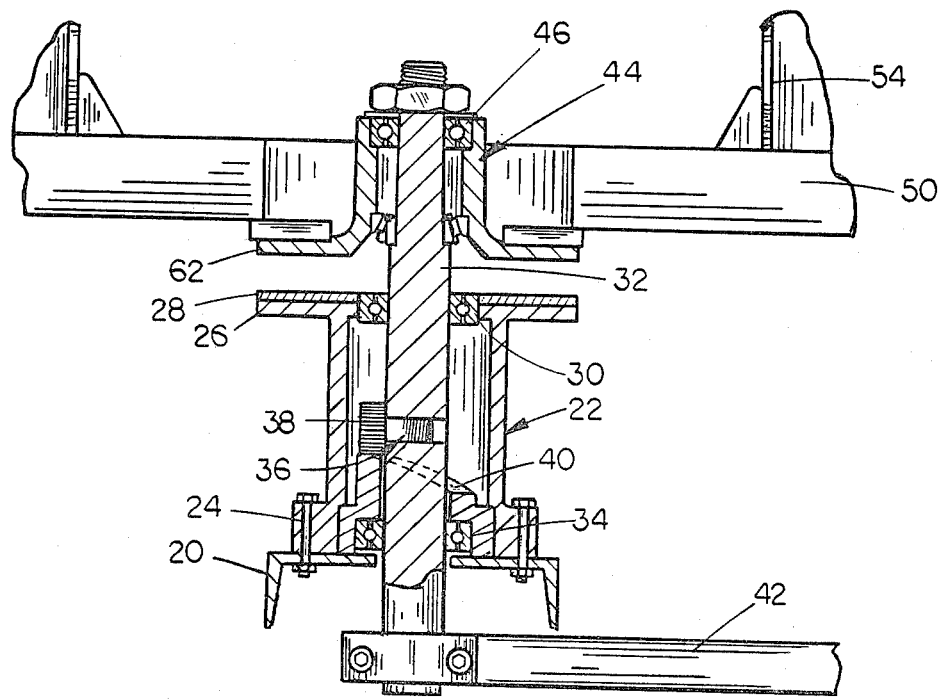
FIG. 5 is a view similar to FIG. 4 except that the coil support has been raised out of engagement with the brake pad.

Dispenser 10 includes a floor-engaging support means 18 including a horizontally disposed channel member 20. Hub means 22 is secured to channel member by bolts 24 and extends upwardly therefrom as seen in FIG. 4. Hub means 22 includes a horizontally disposed annular portion 26 at its upper end having a brake-lining material 28 thereon. Bearing 30 is provided at the upper end of the hub means 22 which embraces shaft 32 extending upwardly therefrom. Shaft 32 extends upwardly through the hub means 22 as seen in FIGS. 4 and 5 and has a bearing 34 embracing the lower end thereof within the hub means 22. Shaft 32 is not only rotatably mounted in the bearings 30 and 34 but it is also vertically movable with respect thereto.

Cam follower 36 is secured to shaft 32 and has roller 38 mounted at one side thereof as seen in FIGS. 4 and 5. Roller 38 is adapted to roll upon the helical cam 40 positioned within hub means 22 so that shaft 32 will be vertically moved from the position of FIG. 4 to the position of FIG. 5 as the shaft 32 is rotated by the arm 42 as will be described in more detail hereinafter.

The numeral 44 refers to a coil support which is rotatably mounted on the upper end of the shaft 32 by means of bearings 46 and 48. As seen in the drawings, coil support 44 is vertically movable with shaft 32. Coil support 44 includes a plurality of radially extending arms 50 adapted to support the coil or reel 52 thereon. Upstanding members 54 are provided on the supports 50 in positioning the reel 52 on the support 44. The coil 52 is maintained on the support 44 by any convenient means such as by some sort of cover 56 clamped onto the upper surface of the reel or coil.

Arm 42 is secured to the lower end of shaft 32 as previously described and extends first laterally therefrom and then upwardly therefrom so that the pulley 58 rotatably mounted on the upper end thereof is disposed laterally of the reel 52.

Figure 2:
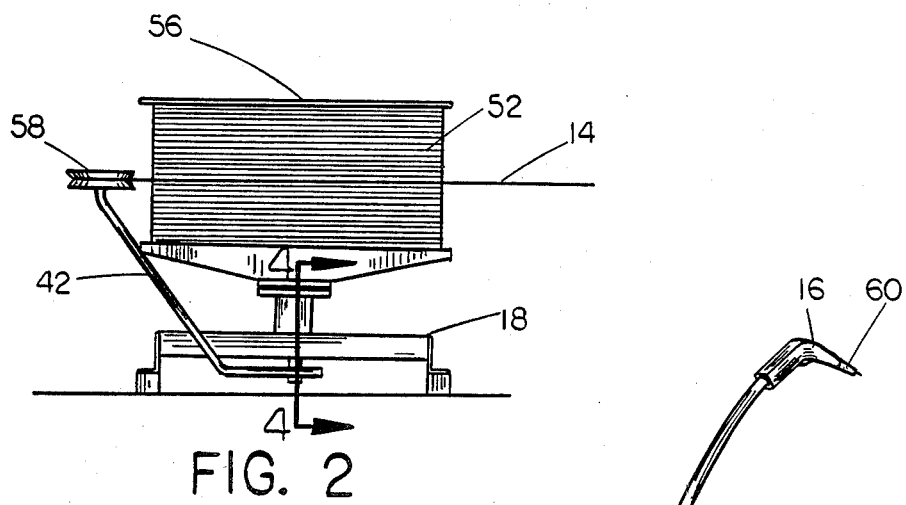
FIG. 2 is a side view of the dispenser of this invention.
Figure 3:
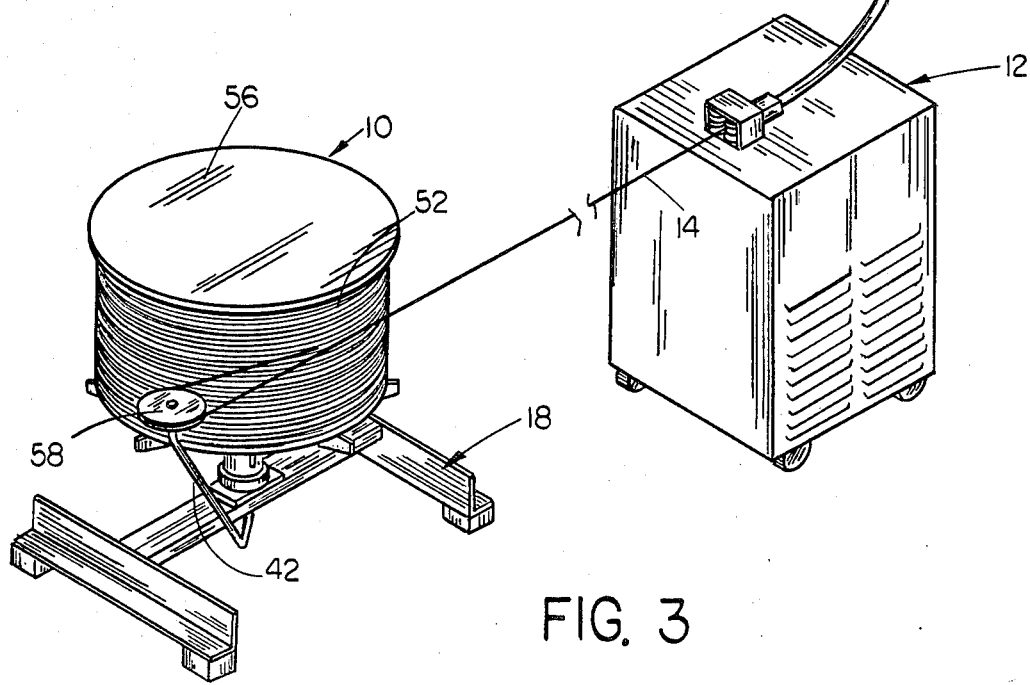
FIG. 3 is a perspective view of the wire dispenser of this invention illustrating its relationship with a wire feeder.

In operation, the cover 56 would be removed and the reel 52 placed on the supports 50, with the cover 56 then being replaced. The straps maintaining the wire on the reel in position would then be removed and the wire 14 extended around the pulley 58 as illustrated in FIGS. 1-3. The wire 14 is then fed through the wire feeder and extended through the tip 60 on the welder 16. The coil support 44 is normally in the position illustrated in FIG. 4 with the annular portion 62 of the support being in frictional engagement with the brake-lining material 28 which prevents rotation of the support means 44. As the wire feeder 12 pulls wire from the coil, the arm 42 will be pivotally moved towards the wire feeder 12 which will cause the shaft 32 to be rotated. The rotation of the shaft 32 causes the roller 38 of the follower 36 to roll upon the helical cam 40 thereby causing shaft 32 to be moved upwardly relative to hub 22. Vertical movement of the shaft 32 causes the annular portion 62 of the support 44 to be moved out of frictional engagement with the brake-lining material 28 thereby permitting support and the coil 52 to rotate so that wire can be dispensed therefrom. When the wire feeder 12 stops pulling wire, the weight of the coil 52 will cause the roller 38 to roll downwardly on the cam 40 to return the arm 42 to the starting position. This particular feature allows the full weight of the wire coil to apply the brake to the rotation of the coil and to stop the rotation of the coil. Thus, when the coil is substantially full, a large amount of force will be needed to brake the coil but the weight of the coil will apply that force. Conversely, when the remaining amount of wire on the coil is low, very little braking force will be needed to halt the rotation of the coil.

The wire dispenser of this invention dispenses the welding wire to the wire feeder in a smooth fashion so that the welding operation will be smooth. Thus it can be seen that the wire dispenser of this invention accomplishes at least all of its stated objectives.

I claim:

1. A welding wire dispenser for dispensing wire to a wire feeder, a support means, a hub means mounted on said support means and extending upwardly therefrom, said hub means having a horizontally disposed annular portion at its upper end, a vertically disposed and vertically movable shaft rotatably mounted in said support means and extending upwardly therefrom through said hub means, a coil support means rotatably mounted on the upper end of said shaft above said hub means and vertically movable with said shaft, said coil support means having a horizontally disposed annular portion at its lower end adapted to frictionally engage said annular portion on said hub means to limit the rotation of said coil support means when said annular portions are in frictional engagement with each other, said coil support means adapted to support a coil of welding wire thereon, an arm means having horizontally disposed lower end portion secured to said shaft and an upper end portion disposed laterally of the coil of wire on the coil support means, a pulley rotatably mounted about a vertical axis on the upper end portion of said arm means adapted to have the welding wire on the coil extending therearound, a helical cam means in said hub means extending around at least a portion of said shaft, and a cam follower mounted on said shaft in engagement with said cam means whereby said cam follower will travel upwardly on said cam means thereby vertically moving said shaft so that said annular portions will not be in frictional engagement with each other so that said coil support means may freely rotate when said arm means is moved towards the wire feeder.

* * * * *